Oct. 4, 1932.  J. A. SERRELL  1,881,099
MEANS FOR CONTROLLING INTERIOR TEMPERATURES
Filed Dec. 11, 1926  2 Sheets-Sheet 1
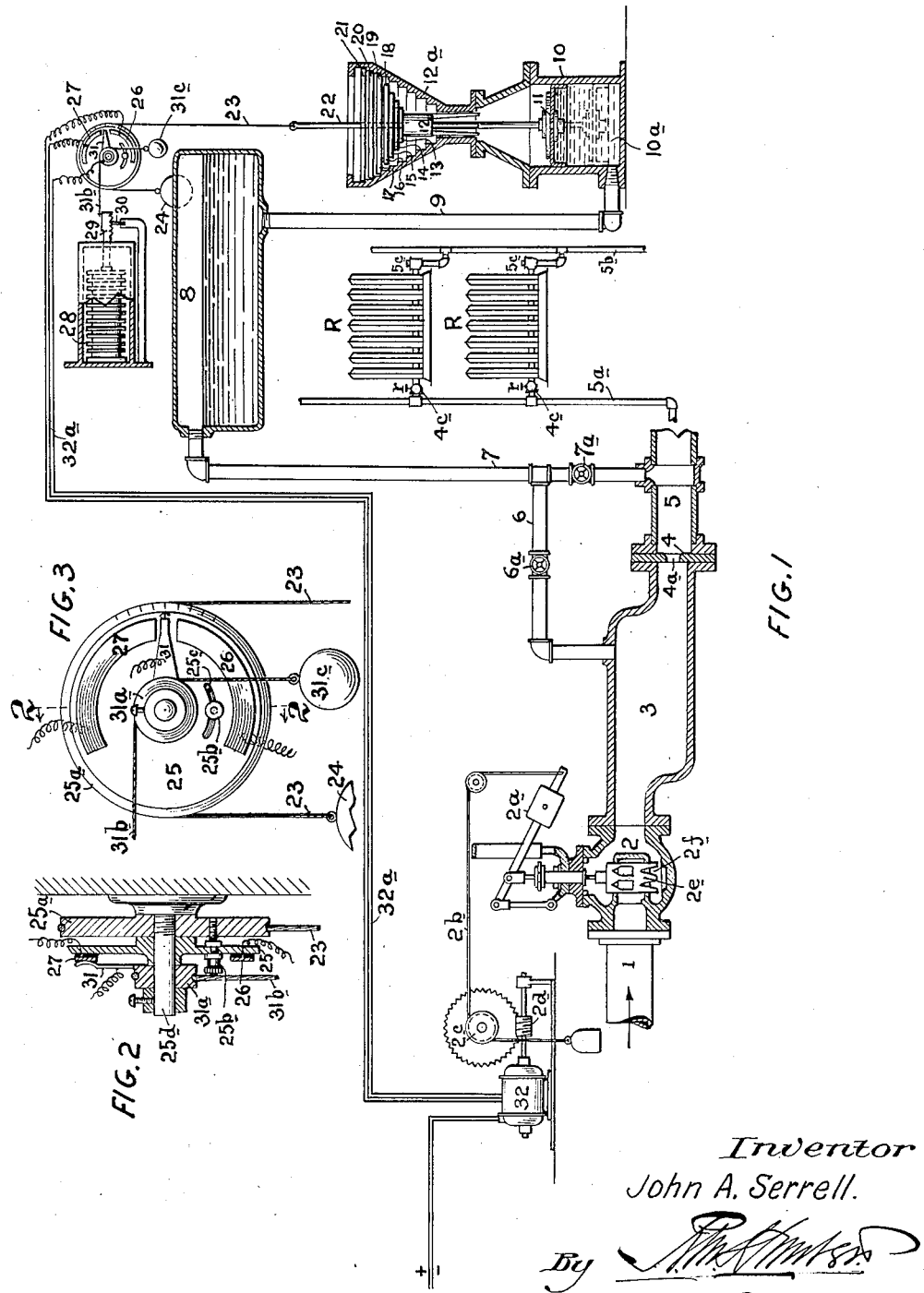
Inventor
John A. Serrell.
By [signature]
Attorney.

Oct. 4, 1932.  J. A. SERRELL  1,881,099
MEANS FOR CONTROLLING INTERIOR TEMPERATURES
Filed Dec. 11, 1926  2 Sheets-Sheet 2
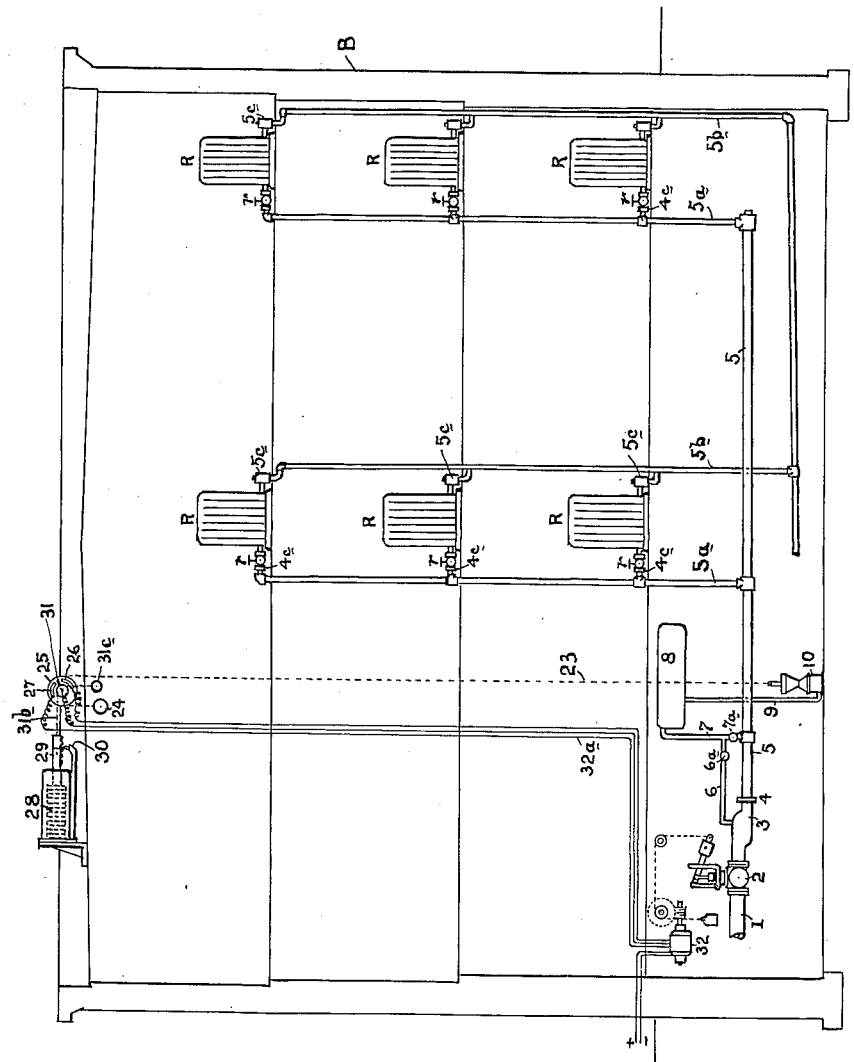
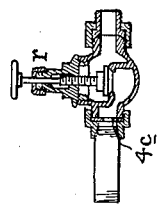
Inventor
John A. Serrell.
By
Attorney.

Patented Oct. 4, 1932

1,881,099

UNITED STATES PATENT OFFICE

JOHN A. SERRELL, OF PASSAGRILLE, FLORIDA

MEANS FOR CONTROLLING INTERIOR TEMPERATURES

Application filed December 11, 1926. Serial No. 154,163.

My invention relates to means for controlling the interior temperature of a structure by automatically varying the amount of heat supplied in proportion to the varying heat transmission losses from the structure due to the varying exterior temperatures in relation to that of the interior.

Existing methods by manual control of the amount of heat supply to conform to observed exterior temperatures have proved highly economical by eliminating to a degree the overheating of the structure during times of relatively small transmission losses and by providing the necessarily greater heat supply during times of high transmission losses; manual control, however, not only causes a considerable expense for labor, but is also liable to induce lowered efficiency due to lack of constant attention.

My invention consists in means for automatically supplying heat to the interior of the structure or structures to be heated in proportion to the heat losses from said structure or structures in order to maintain predetermined interior temperature or temperatures, the said supply of heat being controlled by a thermostat exposed to the varying temperatures to which the structure or structures are subjected.

My invention, in the form shown, comprises automatic means for thermostatically controlling the heat supply in steps or stages from the minimum to maximum requirement, and in so doing it is desirable that steps or stages shall be governed by the variations in exterior or outside temperature from the highest temperature at which any heat is desired to the lowest temperature anticipated.

By properly proportioning the steps or stages into which the heat flow range is divided, the required flow, for any given exterior temperature, may be attained without manual attention to the measuring or controlling device and thereby a close and constant approximation of necessary heat supply to heat loss may be attained, with a minimum of waste due to either over or under heating.

As a further refinement of my invention, the automatic means employed therein are such that they may be subject to manual adjustment for changing the synchronizing steps of temperature and heat flow to automatically maintain a heat balance at different times with different maintained interior temperatures such, for instance, as would occur in a structure in which one maintained degree of temperature was desired during the day and another at night.

With the foregoing statement as to the nature and objects of my improvements in mind, my invention consists of means for carrying the same into effect as more fully described hereinafter and pointed out in the claims.

Referring to the drawings: Fig. 1 is a side elevation, with parts in section, of apparatus which conventionally illustrates one means of applying my invention when the heat conveying fluid is steam; Fig. 2 is a transverse section of a portion of the same, taken on line 2—2 of Fig. 3; Fig. 3 is a front view of the device shown in Fig. 2; Fig. 4 is a diagrammatic view showing my improvements applied to a building or structure to be heated; and Fig. 5 is a sectional detail view of the restricted orifice as applied to the radiator inlets.

While my invention is applicable broadly to controlling the supply of a heating medium such as steam, water, or gas (including air), from a source to a place of use, in variable quantities directly commensurate with requirements due to the variations in temperature of the outside surrounding medium or atmosphere, I have conventionally illustrated my improvement in connection with the supply of steam to a steam heating system such as may be employed in heating buildings.

Steam from main 1 under maximum initial pressure is supplied to the expansion chamber 3 under the control of a valve 2 of suitable construction capable of varying its flow and pressure. The steam under reduced pressure in the expansion chamber 3 is caused to flow through a fixed orifice 4a in plate 4, and thence into horizontal supply main 5 by and from which it may be conveyed to any portion of the building. The steam in said main 5, thus regulated in quantity and relatively low pressure is permitted to ascend risers 5a and to be delivered therefrom into radiators R of any number, size and position desired, located within the building or structure B to be heated. The supply of steam to the radiators may be direct from the risers by means of valves r and, if desired, may be further governed by passing through fixed orifices 4c, the latter being intended to more uniformly distribute the supply of steam to the several radiators. The water of condensation from the radiators may be returned to the source of steam generation by suitable return pipes 5b with or without the employment of return valves 5c, which permit the passage of water and air but will restrict or prevent the escape of steam. It will be evident that for every stage or step difference in steam pressure which may exist between expansion chamber 3 and the steam main 5, there will be a variation in pressure and volume of steam flowing into the main 5 corresponding to any variation of pressure in said main 5 and its risers 5a. As it is the function of my invention to cause this variation in the steam supply to the radiators and mains leading thereto to take place synchronously with variations in the external temperature, such as the temperature outside of the building or temperatures commensurate therewith, I have, in carrying out my invention, employed a fluid motor acting in steps or stages of pressure and governed by variations in outside temperature, to control the operation of the supply valve 2, whereby the same will be automatically actuated to increase the supply of steam as the outside temperature lowers, and vice versa.

In the construction shown, the fluid motor 28 acting in steps or stages of pressure is employed to actuate in unison two reversing poles of an electric switch and thereby cause an electric motor 32 to increase or decrease the opening of the adjustable supply valve 2. In the particular illustration, the supply valve 2 is substantially a balanced valve which is automatically closed by a weighted lever 2a and actuated by a cable 2b in turn controlled by a drum 2c which is driven in one or the other direction, as the case may be, by the electric motor 32 through the worm and worm wheel gearing 2d. The control valve 2 is shown as having a tubular piston-like valve piece 2e provided with V shaped orifices 2f which control the flow and pressure of steam in a gradual manner.

Referring more particularly to the details, whereby the electric motor operates the valve 2 in accordance with changes of outside temperature, the following features are important: Fluid pressure is transmitted from the steam main 5 through a pipe 7 and into a head chamber 8 which contains a fluid such as water and whereby it varies the effectiveness of the static head pressure in the barometric column 9, so that such variations in pressure are made effective upon the fluid in the piston chamber 10a of the pressure motor 10 by transmitting said pressure to the movable piston 11 therein. As the barometric column or head, supplemented by the steam pressure, increases, the piston 11 rises, and vice versa. As the piston 11 rises under the pressure of the water column exerted through the pipe 9, supplemented by the steam pressure in the head chamber 8 and opposed by atmospheric pressure on the upper side of piston 11, the hub 12 upon the piston rod 22 also rises and while rising it picks up and supports, in sequence, the accumulating weights 13 to 21 which accumulatively provide gravity pressures which counter-balance variations in the steam pressure in the head chamber 8. As the piston rod 22 rises, it causes the disk 25 to rotate anti-clockwise by the cable 23 which extends about the disk and has one end connected with the piston rod and the other end counter-weighted at 24. As shown, the counter-weights 13 to 21 are successively of increasing diameter and weight and normally rest upon a stepped support 12a of more or less conical form. The stepped support is preferably formed with a plurality of steps of gradually decreasing height from the bottom to the top of the support, so that the counter-weights as a whole provide an increasing gravity effect by reason of the consecutive additions of the weights 13 to 21 being loaded upon the piston as it rises and falls under the pressure changes in the supply main of the heating system. The distance to which the counter weight is moved before the next heavier weight is reached gradually decreases, and consequently the piston 11 would be required to move vertically a gradually lesser linear extent as the counter weights from the smallest to the greatest are successively accumulated. I, however, do not restrict myself to the details of applying the increasing resistance to the upward movement of the piston nor to the means for directly actuating the disk 25 by the rising and falling of the piston.

In the form of controller illustrated, the disk 25 is provided with curved electrical contacts 26 and 27 which, when the disk is oscillated, are caused to contact with a pivoted on a horizontal pin 25d and oscillated by oted on a horizontal pin 25d and oscillated by means of a cable 31b passing about the hub 31a to which contact finger 31 is secured) and weighted at one end at 31c while the other end is connected to the movable or free end of a projecting rack arm 29 of a thermostatic motor 28. The said thermostatic motor 28 is placed where it is effected by the outside temperature and is, therefore, independent of the temperature in the building in the vicinity of the radiators and heating system generally.

32a are control circuits from the electric motor 32 and as shown are three in number, one being connected with the contact 26, another with the contact 27, and the third with the adjustable contact finger 31. When the contact finger 31 is intermediate of the two curved contact blocks 26 and 27, the electric motor 32 is at rest. When the contact finger 31 is moved over the contact block 26, the circuits are closed so that the motor 32 runs in one direction to reduce the extent of opening of the valve 2 and if, on the other hand, the contact finger 31 is moved to make contact with the contact block 27, then the circuit is closed to make the electric motor 32 rotate in the opposite direction and thereby open the valve 2 to a greater extent.

The thermostatic motor member 28 may consist of a thermostatically actuated bellows whose free end is connected with the movable rack arm 29. The rack 29 is arranged to move horizontally over a knife or wedge-shaped bearing 30, in accordance with the outside temperature variations or commensurate therewith, such as where "key room" temperatures are employed. When contact 31 is moved into electrical connection with the contact block 26, the valve 2 is moved as in closing; when the contact finger 31 is moved into electrical connection with the contact block 27, the valve 2 is moved as in opening; and when the contact finger 31 is between the contact blocks 26 and 27, but out of electrical connection with both of them, the valve 2 remains stationary in whatever position it may have assumed. The special function of the wedge-shaped bearing 30 and the rack 29 with which it cooperates is to accelerate or delay the action of the motor member 28 so that it operates, as it were, in steps, that is to say, for any expansion or contraction of the thermostatic motor member 28 it will move the contact member 31 to a small extent which adjustment will be retained for a period which will continue until by a further expansion or contraction of the thermostatic motor member the movable rack 29 will be moved to such further extent as to be forcibly snapped into contact with the bearing 30 corresponding to the next adjacent tooth of the rack. In this way, the intermittent movement corresponds to steps or stages in the adjustment of the contact finger 31.

It will be understood that as the piston 11 of the pressure motor 10 rises under pressure, due to the static head or barometric column 9 plus the pressure in the steam main 5, it will accumulate the weights 13 to 21 successively, as may be necessary to balance the steam pressure in the horizontal main 5. Whatever movement is imparted to the piston 11, it will cause, through the cable 23, a corresponding relative movement of the disk 25 and, therefore, movement of the contact blocks 26 and 27 about the axis of the contact finger 31, with the result that the neutral position of the said contact blocks 26 and 27 will be changed, and should the outside temperature vary more or less, steam may be admitted by the valve 2 and thus change the pressure conditions in the steam main 5 and head chamber 8. This change in pressure, acting through the piston 11, causes the disk 25 to move and automatically shift the contact blocks 26 and 27 relatively to the contact finger 31 and thereby insure a new neutral position for the parts, so that the electric motor 32 will remain at rest and the steam supply through the valve 2 will continue under the adjustment then existing. The variation in outside temperature causes contact finger 31 to change its position and in so doing contact with either block 26 or 27, and thereby either open or close valve 2 and increase or decrease pressure in pressure motor 10 until said pressure becomes that under which the blocks 26 and 27 are moved so as to be shifted out of contact with finger 26.

The condition then existing might continue indefinitely, unless changes of temperature in the outside atmosphere should take place, and in the event of such temperature changes, the apparatus would automatically readjust itself either under the influence of the steam pressure in the main 5 or under the influence of the thermostatically controlled motor 28 as it may be affected by outside atmospheric changes in temperature. Assuming that the latter occurred as a drop in temperature, then the effect would be to contract the expansible thermostatic motor member 28, and cause the contact finger 31 to move anti-clockwise to a greater or less extent, according to the degree of drop in temperature. Such a movement of the contact finger 31 will bring it into contact with the contact block 27 and thereby close the circuits 32a in such manner as to cause the electric motor 32 to operate to open the valve 2 to a slightly greater extent. The effect of thus increasing the opening of the valve 2 will be to cause additional steam to be supplied to the expansion chamber 3 and thence through the orifice 4a into the steam from which it passes to the radiators in greater amount owing to the increased pressure difference between the pressure in the main 5 and that in the radiator action increases the effective portion of each of the radiators which is under the heating influence of the steam.

It follows that for each step or position of the thermostatic motor 28, actuated by exterior temperature, there is one position or step of the pressure motor 10 in which the flow of heating medium is just sufficient to cause a certain pressure in the main 5, and that if the flow through valve 2 is or becomes materially greater or less, a change in pressure will occur in the said main 5 which, in turn, will change the position of contact blocks 26 and 27 in relation to contact finger 31 and cause a corresponding variation in the opening of valve 2.

To prevent the electric motor 32 from continuing its operation for an excessive period of time and abnormally open the valve 2, the control of said motor is made effective by the increased pressure of the steam in the head chamber 8 and the effect of that increased pressure upon the barometric water column 9 acts upon the piston 11 causing it to rise and lift one or more weights (13 to 21), as the case may be, and rotating the disk 25 automatically counter-clockwise until the neutral point between contact blocks 26 and 27 is brought under the contact finger 31. Thereupon, the operating circuit to the motor 32 is opened and the motor temporarily ceases to function but holds the valve 2 in its new position of adjustment. If the outside temperature should rise, then the contact finger 31 and the disk 25 would successively be moved clockwise, with the result that the closing of the circuit between finger 31 and contact block 26 causes the motor 32 to rotate in a reverse direction and slightly close the valve 2. Thereafter, the reduced pressure of the steam in head chamber 8 will permit the piston 11 to move downward under the influence of the excessive weights supported thereby and the disk 25 will be shifted once more so that the space between the contact blocks 26 and 27 will be brought beneath the contact finger 31 and the electric circuit once more interrupted. In this manner, the control valve or orifice for the admission of steam from the main 1 into the expansion chamber 3, and thence to the steam main 5 through the orifice 4a, may be automatically controlled so that a greater or less amount of steam is supplied to the radiators as may be necessary to maintain a substantially constant temperature in the room or rooms heated by the radiators, irrespective of variations in the external atmosphere.

6 is a bypass directly from the expansion chamber 3 to the pipe 7 leading to the head chamber 8 and is provided with a valve 6a which, if opened while the valve 7a in the pipe 7 adjacent to the main 5 is closed, the pressure in the expansion chamber 3 will be the pressure supplied to the head chamber 8 to assist the barometric or static head 9 in operating upon the piston 11. In some applications of my invention, operation may be had with pressure through valve 6a to pressure motor 10 instead of through valve 7a, the valve 2 being directly actuated by variations in pressure in expansion chamber 3 which, in turn, will control the amount of heat medium flowing through orifice 4a with a given pressure difference. The use of a variable orifice in valve 2 in conjunction with a fixed orifice 4a, from beyond which the actuating pressure to motor piston 11 is provided, will permit of a finer graduation in fluid amount and pressure. I, therefore, do not limit myself to the utilization of steam pressure in the main 5 as distinguished from the steam pressure in the expansion chamber 3. In fact, my invention may be put into practice by utilizing the steam pressure at any place in the supply side of the heating system on the delivery side of the automatic control valve 2.

It will be understood that the mechanism shown, exclusive of the thermostatic motor member 28 for moving the contact finger 31, is all actuated and governed by the pressure conditions of the steam, whereas, on the other hand, the adjustment of the contact finger 31 is automatically performed by the thermostatic motor device 28, under the influence of the variations in temperature of the outside atmosphere. The simultaneous or sychronous operations of these two devices or mechanisms, (whereby the circuits to the operating electric motor 32 are interrupted or closed for causing the motor to run forward or be reversed, as the case may be), are of the essence of my invention, and particular attention is directed to the series of variable weights 13 to 21, which are proportioned so that the pressure responsive means is variably loaded to produce with approximate accuracy the varying pressure differences across the restricted inlet orifices at the radiators for varying steps of outdoor temperature change to bring about the desired result of proportional fractional filling of the radiators in response to exterior temperature changes, one side of the pressure responsive means being connected to steam main 5 (or the receiver 3) while the other side is responsive, during periods of fractional filling, to pressure conditions equivalent to those existing in the return piping and in the radiators. The capacity for holding the motor at rest when there are no material variations in external temperature is an important feature of these improvements.

In the foregoing description, I have assumed the disk 25 to be operated by the cable 23, but in the drawings I have shown that the cable operates a disk 25a to which the disk 25 is secured by means of a clamping screw 25b extending through a slot 25c in the said disk, so that the contact blocks 26 and 27 may be adjusted circumferentially by hand relatively to the disk 25a which is directly moved by the cable 23. By means of this refinement, I not only provide automatic means for regulating the supply and volume of steam in accordance with variations in outside temperatures, but I further provide means for varying the determined interior temperature in relation to the variable exterior temperature by manualy adjusting the contact blocks 26 and 27 together with their support circumferentially with respect to the cable operating member or disk 25a. By varying the axial angle of the disks 25 and 25a, in any variation in the points or steps of the pressure motor 10 and that of the thermosat 28 may be selected and new positions of synchronism obtained. For instance, if it should be desired to increase the temperature within the building and yet, at the same time, to cause the steam supply to be automatically controlled by the varying temperature of the outside atmosphere, it is only necessary for the clamping screw 25b to be loosened and the disk 25 (with its contact blocks 26 and 27) turned slightly clockwise relatively to the disk portion 25a and then again clamped thereto. Where a relatively lower normal temperature is required, the adjustment should be made anti-clockwise.

It will be seen that in carrying out the invention use is made of the principle that the flow of any fluid used for conveying the heat through an orifice, or series of orifices, will vary approximately as the square root of the difference between initial and terminal pressures and that at a given pressure difference a certain amount of heat will flow while at a lesser pressure difference (say one-quarter of the given pressure difference), only one-half that amount of steam will flow; and that by employing means to vary, by steps or stages, the pressure difference or "head", a corresponding variation in steps or stages of the flow will result. By automatically synchronizing these stages of pressure difference to conform to steps or stages in the variation in outside temperature, I am able to attain the new and useful result of automatically proportioning the heat supply to the structure to be heated to the variable transmission losses therefrom in order to maintain any predetermined desirable temperature in the building or structure to be heated.

In describing the construction and operation of my improvements, I have, by way of example, more particularly referred to the heating medium or fluid as steam as that is more commonly employed as a heating fluid, but I do not in any wise limit myself thereto, and what I have said in respect to steam when referring to the heating medium, both in the specification and claims, is to be understood as including other eqqivalent heating mediums such as hot water, heated air and gas.

In this application I make no claim to the method of controlling the interior temperature of a structure in accordance with varying temperature changes outside of the structure and which may be carried out by use of the means forming the subject matter of the present application, said method being separated out of this application to form subject matter of a divisional application.

I have described my improved means in what I deem to be the best exposition of my invention and well suited to commercial practice, but I do not restrict or confine myself to the minor or secondary details, as such are susceptible of modification which may be resorted to as matters of mechanical skill and without a departure from the spirit of the invention.

Having now described my invention, what I claim and desire to secure by Letters Patent is:

1. In a heating system, the combination of a structure to be heated, a relatively high pressure steam main for supplying steam, a relatively low pressure steam supply main for supplying steam at a lower pressure to the radiators of the structure to be heated, adjustable valve means in the supply main between the high pressure main and the lower pressure supply main normally remaining in the various open positions of its adjustment, motor means for positively readjusting the valve means to different positions of open adjustment for supplying steam in greater or less quantity and pressure to the low pressure supply main, thermostatically operated means actuated by temperature changes exterior to the structure to be heated for causing through said motor means adjustments of the valve means whereby the steam in the supply main is varied inversely with the variations in temperature exterior to the structure and a substantially variable pressure differential is maintained within the structure, and means actuated by pressure variations within the steam supply main on the delivery side of the valve means for arresting the action of the thermostatic means upon the motor means when the required variable pressure changes within the supply main have been produced.

2. The invention according to claim 1, including, manually operable means for adjusting the pressure actuated means for regulating the operation of the motor means and thereby the supply of steam to the supply main to enable the predetermined interior temperature of the structure to be changed while maintaining the automatic control due to the changes of exterior temperature.

3. In a heating system, the combination of a structure to be heated to a substantially predetermined temperature, a plurality of radiators in said structure, a restricting orifice in the inlet of each radiator, a high pressure main for supplying heating medium under pressure, a lower pressure supply main and branch pipes for supplying heating medium to the restricting orifices of the radiators, a valve device between the high pressure main and the lower pressure supply main for controlling the supply of heating medium to the inlet orifices of the radiators, electrically driven motor means for imparting opening and closing movements to the valve device to increase or decrease the pressure and thereby control the quantity of the heating medium supplied to the radiators, a source of electric energy, electric circuits for energizing the electrically driven motor means, thermostatically operated means under the control of temperature changes exterior to the structure to be heated for controlling step-by-step the operation of the electrically driven motor means for causing it step-by-step to impart opening and closing movements to the valve device, and pressure actuated means operating in accordance with the pressure changes in the heating medium supplied to the inlets of the radiators for controlling the operation of the valve device in its opening and closing movements when changes in pressure of the heating medium takes place to substantially maintain the predetermined normal temperature required within the structure.

4. In combination with a structure to be heated and maintained at a substantially uniform temperature, a plurality of radiators within the structure for heating it, a high pressure main for supplying heating medium under pressure, a lower pressure supply main and branch pipes for supplying heating medium to the radiators, restricting orifices in the inlets of the radiators, a valve device between the high pressure main and lower pressure supply main for controlling the supply of heating medium to the inlet restricting orifices of the radiators, thermostatically operated means under control of variations of temperature exterior to the structure, motor means for positively adjusting the valve device to vary the pressure of heating medium supplied to the lower pressure supply main and inlet orifices of the radiators, pressure actuated means operated by the variations in pressure in the lower pressure supply main, and electrically operating means common to both the thermostatically operated means and the pressure actuated means for operating the motor means to adjust the valve device for variations in the outside temperature and pressure variations of the heating medium, whereby the predetermined normal interior temperature of the structure may be maintained during variations in the external temperature.

5. The invention according to claim 4, an electric motor means for adjusting the valve device, and the electrically operating means common to both the thermostatically operated means and the pressure actuated means including a source of electric energy, electric circuits therefrom energizing the electrically driven motor, and contact devices controlling the electric circuits under thermostatic influence for insuring the operation of the electric motor means when producing opening and closing movements of the valve device and for opening said circuits to arrest the operation of the electric motor means when the required pressure of the heating medium within the supply main is reached.

6. In a heating system, the combination of a structure to be heated, radiators therein, a steam main delivering steam at a relatively high initial pressure, a supply main for supplying steam to the radiators, an adjustable valve device between the high pressure steam main and the supply main supplying steam in controlled quantities to the radiators at a pressure less than the initial pressure, an electric motor operating the valve device, and automatic means under simultaneous control of temperature changes exterior to the structure comprising electrically operated means controlled by pressure variations in the steam supply main for controlling the electric motor operations in both the opening and closing movements of the valve device.

7. In a heating system, the combination of a structure to be heated, radiators therein, a steam main delivering steam at a relatively high initial pressure, a supply main supplying steam to the radiators, an adjustable valve device between the high pressure steam main and the supply main supplying steam in variable controlled quantities to the radiators and at various increasing and decreasing pressures less than the initial pressure to provide a varying steam supply to the radiators, a constant pressure return main, means controlling the opening and closing movements of the valve device including intermittently operated means for adjusting the valve device to admit varying quantities of steam according to its various adjustments, and means under the control of temperature changes exterior to the structure comprising a thermostatic device and mechanism for controlling the intermittently operated means for adjusting the valve device.

8. In a heating system, the combination of a structure to be heated, radiators therein, a steam main delivering steam at a relatively high initial pressure, a supply main supplying steam to the radiators, an adjustable valve device between the high pressure steam main and the supply main supplying steam in controlled variable quantities to the radiators at pressures less than the initial pressure, a constant pressure return main, thermostatically operated means under the influence of temperature changes exterior to the structure, a pressure motor device operating under control of pressure changes within the supply main, and devices actuating the valve device common to both the thermostatically operated means and the pressure motor device whereby changes in exterior temperatures and steam pressure within the heating system of the structure, either or both, cooperate in determining the extent and time of control of the valve device which regulates the quantity of steam delivered from the high pressure main to the supply main of the heating system within the structure.

9. The invention according to claim 8, when having a gradually increasing gravity resistance means, opposing the movement of the pressure motor device and importing a step-by-step movement to the valve device.

10. In a heating system, the combination of a structure to be heated, radiators therein, a steam main delivering steam at relatively high initial pressure, a supply main supplying steam to the radiators, an adjustable motor operated valve device between the high pressure steam main and the supply main for supplying steam in controlled quantities to the radiators at pressures less than the high initial pressure, a thermostatic device actuated by temperature changes outside of the structure, a pressure motor device having a gradually increasing gravity resistance actuated by the steam pressure within the supply and distributing mains of the heating system within the structure, electric contacting devices partly actuated by the thermostatic device and partly by the pressure motor device, and electrically actuated means controlled by said electric contacting devices for controlling the operation of the motor of the adjustable valve device.

11. In a steam heating system having radiators and a return main open to the atmosphere, the combination of a pressure regulator for controlling the supply of steam to the system, a fixed orifice in series with the pressure regulator and through which the steam is delivered to the system, a restricting inlet orifice at each radiator proportioned to admit into the several radiators varying proportional quantities of steam supplied by the pressure regulator, temperature responsive means for controlling the operation of the pressure regulator in accordance with outside temperature changes, pressure responsive means co-ordinated with said temperature responsive means for controlling the operation of the pressure regulator in accordance with pressure changes within the system, means integrally associated with the pressure responsive means which on one side is responsive to the pressure of the steam delivered by the pressure regulator and on the other side, is in pressure communication with the terminal side of the said radiator orifices for varying the combined effect of the pressure and temperature responsive means in controlling the pressure regulator in response to variations in outside temperature.

12. In a steam heating system having radiators and a return main therefor open to the atmosphere, the combination of a steam supply main for the system, a pressure regulator for regulating the steam delivered to the supply main, a fixed orifice in series with the pressure regulator and through which the steam is delivered to the system, temperature responsive means for controlling the operation of the pressure regulator in accordance with outside temperature changes, pressure responsive means having additional integral means co-operatively controlling the pressure regulator responsive to pressure changes on the supply side of the fixed orifice of the system and to the pressure existing in the return main for varying the combined effect of the pressure responsive means and temperature responsive means in controlling step-by-step the pressure regulator in response to variations in the outside temperature, and restricting orifices at the inlets of the respective radiators to admit varying proportional quantities of the heating medium into the radiators.

13. In a steam heating system, the combination of a steam supply main for the system, radiators each provided with a restricted inlet orifice for admitting varying proportional quantities of the heating medium for providing for fractional heating of the radiators, a return main receiving discharge from the radiators, a pressure regulator for controlling the steam delivered to the heating system, temperature responsive means for controlling the pressure regulator, pressure responsive means co-ordinated with said temperature responsive means for controlling the operation of the pressure regulator in accordance with pressure changes within the system, and means integrally associated with the pressure responsive means which on one side is in pressure communication with the delivery side of the pressure regulator and on the other side is in pressure communication with the terminal side of the radiator orifice, for varying the combined effect of the pressure and temperature responsive means in controlling, step-by-step, the operation of the pressure regulator responsive to variations in outside temperature.

14. In a heating system, the combination of a steam supply main for the system, radiators each provided with a restricting inlet orifice for admitting varying proportional quantities of the heating medium into the radiators, a return main into which the radiators discharge, a pressure regulator for controlling the supply of heating medium to the system, a fixed orifice in series with the pressure regulator and through which the heating medium is delivered to the system, temperature responsive means for controlling the pressure regulator in accordance with outside temperature changes, pressure responsive means co-ordinated with the temperature responsive means, means integrally associated with the pressure responsive means which on one side is responsive to pressures on the delivery side of the pressure regulator and on the other side, is in pressure communication with the terminal side of the said fixed orifice for varying the combined effect of the pressure responsive means and the temperature responsive means in controlling, step-by-step, the pressure regulator in response to variations in outside temperature.

15. The invention according to claim 11, wherein further, manually operable means are provided for varying the combined effect of the temperature responsive and pressure responsive means.

16. The invention according to claim 12, wherein further, manually operable means are provided for varying the combined effect of the temperature responsive and pressure responsive means.

17. The invention according to claim 13, wherein further manually operable means are provided for varying the combined effect of the temperature responsive and pressure responsive means.

18. The invention according to claim 14, wherein further, manually operable means are provided for varying the combined effect of the temperature responsive and pressure responsive means.

19. In a heating system, the combination of a structure to be heated to a substantially predetermined temperature, a plurality of radiators in said structure, a restricting orifice in the inlet of each radiator, a high pressure main for supplying heating medium under relatively high pressure, a lower pressure supply main and branch pipes for supplying heating medium to the restricting orifices of the radiators, a main valve device between the high pressure main and the lower pressure supply main for controlling the simultaneous supply of heating medium to the inlet orifices of the radiators, motor means for operating the valve device to increase or decrease the pressure and thereby control the quantity of the heating medium supplied to the radiators, thermostatically operated means under the control of the temperature changes exterior to the structure for controlling the operation of the valve device to vary the supply of heating medium to the radiators with variations in temperature exterior to the structure, and separate pressure actuated means operating in accordance with pressure changes of the heating medium supplied to the system for limiting the operation of the valve device in its opening and closing movements when the required pressure changes within the supply main have taken place so as to substantially maintain the predetermined temperature required.

20. In a heating system, the combination of a structure to be heated substantially to a predetermined temperature, a plurality of radiators in said structure, a restricting orifice in the inlet of each radiator, a relatively high pressure main for supplying a heating medium, a lower pressure supply main, and branch pipes for supplying the heating medium to the restricting orifices of the radiators, a valve device between the high pressure main and the lower pressure supply main for controlling the supply of heating medium to the inlet orifices of the radiators, electrically driven motor means for imparting movements to said valve device, thermostatically operated means under the control of temperature changes exterior to the structure to be heated, a pressure-sensitive means actuated by the difference between the initial and terminal pressures on opposite sides of said orifices, and means controlled by said thermostatic means, and by said pressure-sensitive means for so operating said motor as to cause it, step-by-step, to impart opening and closing movements to said valve device, substantially to maintain the predetermined normal temperature required within the structure.

21. In a heating system, the combination of a structure to be heated substantially to a predetermined temperature, a plurality of radiators in said structure, a restricting orifice in the inlet of each radiator, a relatively high pressure main for supplying a heating medium, a lower pressure supply main, and branch pipes for supplying the heating medium to the restricting orifices of the radiators, a valve device between the high pressure main and the lower pressure supply main for controlling the supply of heating medium to the inlet orifices of the radiators, electrically driven motor means for imparting movements to said valve device, thermostatically operated means under the control of temperature changes exterior to the structure to be heated, means controlled by said thermostatic means for so operating said motor as to cause it to impart opening and closing movements to said valve device, and means actuated by pressure differences between the inlet and terminal pressures on opposite sides of the radiator orifices, for controlling, step-by-step, the operating of the valve device in its opening and closing movements, when changes in said pressure differences take place.

22. In a heating system, the combination of a structure to be heated substantially to a predetermined temperature, a plurality of radiators in said structure, a restricting orifice in the inlet of each radiator, a relatively high pressure main for supplying a heating medium under pressure, a lower pressure supply main, and branch pipes for supplying the heating medium to the restricting orifices of the radiators, a valve device between the high pressure main and the lower pressure supply main for controlling the supply of heating medium to the inlet orifices of the radiators, electrically driven motor means for imparting opening and closing movements to the valve device, to cause increase or decrease of pressure, thermostatically operated means under the control of temperature changes exterior to the structure to be heated, for controlling, step-by-step, the operation of the said electrically driven motor means to cause it, step-by-step, to impart opening and closing movements when changes in the said external temperature take place, substantially to maintain the predetermined normal temperature required within the structure.

23. In a heating system, the combination of a structure to be heated substantially to a predetermined temperature, a plurality of radiators in said structure, a restricting orifice in the inlet of each radiator, a relatively high pressure main for supplying a heating medium under pressure, and a relatively low pressure supply main and branch pipes for supplying the heating medium to the restricting orifices of the radiators, a valve device between the high pressure main and the low pressure supply main for controlling the supply of heating medium to the inlet orifices of the radiators, electrically driven motor means for imparting opening and closing movements to the valve device, to cause increase or decrease of pressure, thermostatically operated means for controlling, step-by-step, opening and closing movements of the valve device, when changes in the temperature take place.

24. In a heating system, the combination of a structure to be heated substantially to a predetermined temperature, a plurality of radiators in said structure, a relatively high pressure main for supplying a heating medium under pressure, a lower pressure supply main connected with said radiators, a valve device between the high pressure main and the lower pressure supply main, an electrically driven motor means for imparting opening and closing movements to the valve device, means for causing said motor means to operate step-by-step, and a thermostatic device for controlling said means for operating said motor means.

25. In a heating system, the combination of a structure to be heated substantially to a predetermined temperature, a plurality of radiators in said structure, a relatively high pressure main for supplying a heating medium under pressure, a lower pressure supply main, and branch pipes for supplying the heating medium to the radiators, a valve device between the high pressure main and the lower pressure main, controlling the supply of heating medium to the radiators, electrically driven motor means for imparting opening and closing movements to the valve device, means actuated by pressure difference in the heating medium between the pressure in the lower pressure supply main and the terminal pressure of the heating medium, for controlling the operation of the valve device in its opening and closing movements when changes in the pressure of the heating medium take place, substantially to maintain the predetermined normal temperature required within the structure, and means for opening the circuit of said motor controlling means when said valve device has been adjusted.

26. In a heating system, the combination of a structure to be heated substantially to a predetermined temperature, a plurality of radiators in said structure, a relatively high pressure main for supplying a heat medium, a low pressure supply main, and branch pipes for supplying the heating medium to the radiators, a valve device between the high pressure main and the lower pressure main for controlling the supply of heating medium to the radiators, electrically driven motor means for imparting opening and closing movements to the valve device, to cause increase or decrease of pressure, thermostatically operated means for controlling, step-by-step, the operation of the said electrically driven motor, means to cause it, step-by-step, to impart opening and closing movements to the valve device, and means for opening the circuit of said motor controlling means when said motor means has adjusted the position of said valve device for the existing conditions.

27. In a heating system, the combination of a valve for regulating admission of steam to said system, a motor for operating said valve, a control for said motor, a thermostatic motor exposed to outside atmosphere, and having means for so setting said control as normally to produce a given steam pressure within the system, for a given temperature outside, and a device operated by pressure within the system for so varying said control as to bring said steam to the desired pressure, when the former differs from the latter.

28. In a steam heating system, the combination of a valve for regulating admission of steam to said system, a motor for operating said valve, a control for said motor, a device operated by pressure within the system for setting said control, and a thermostatic motor exposed to outside atmosphere and so connected to said control as to vary said setting.

29. In a steam heating system, the combination of a valve for regulating admission of steam to said system, a motor for operating said valve, a control for said motor, a thermostatic motor exposed to outside atmosphere for setting said control, and a device operated by pressure within the system for varying said setting produced by the thermostatic control.

30. In a steam heating system, the combination of radiators, pipes leading to and pipes leading from said radiators, a valve for regulating admission of steam to said pipes leading to said radiators, a motor for operating said valve, a control for said motor, a thermostatic motor exposed to outside atmosphere for setting said control, and a device operated by pressure within the system for varying said setting produced by the thermostatic motor.

31. In a steam heating system, the combination of radiators, pipes leading to and pipes leading from said radiators, a valve for regulating admission of steam to said pipes leading to said radiators, a motor for operating said valve, a control for said motor, a device for setting said control, said device being operated by the difference in pressure between the initial and terminal pressures of the heating medium.

32. In a steam heating system, the combination of radiators, pipes leading to and pipes leading from said radiators, a valve for regulating admission of steam to said pipes leading to said radiators, a motor for operating said valve, a control for said motor, a device for setting said control, said device being operated by the difference in pressure between the initial and terminal pressures of the heating medium, and a means for stopping said motor when it has effected the proper adjustment of said valve for the existing conditions.

33. In a steam heating system, the combination of a structure to be heated substantially to a predetermined temperature, a plurality of radiators in said structure, a relatively high pressure main for supplying a heating medium, a lower pressure supply main, and branch pipes for supplying the heating medium from the latter to the radiators, there being a plurality of restricting orifices between the main valve and each radiator, a valve device controlling the supply of heating medium to the said radiators, and an automatic means for regulating the said valve device proportionately to the difference between the initial and terminal pressures of the heating medium.

34. In a steam heating system, the combination of a structure to be heated substantially to a predetermined temperature, a plurality of radiators in said structure, a relatively high pressure main for supplying a heating medium, a lower pressure supply main, and branch pipes for supplying the heating medium from the latter to the radiators, there being a plurality of restricting orifices between the main valve and each radiator, a device for controlling the supply of the heating medium to the radiators, and an automatic means for regulating said controlling device proportionately to the difference between the initial and terminal pressures on opposite sides of said orifices.

35. In a steam heating system, the combination of a structure to be heated substantially to a predetermined temperature, a plurality of radiators in said structure, a relatively high pressure main for supplying a heating medium, a lower pressure supply main, and branch pipes for supplying the heating medium from the latter to the radiators, there being a plurality of restricting orifices between the main valve and each radiator, a valve device between the high pressure main and the low pressure main for controlling the supply of heating medium to the said radiators, an automatic means for regulating the said valve device proportionately to the difference between the initial and terminal pressures on opposite sides of the said orifices.

36. In a steam heating system, the combination of a structure to be heated substantially to a predetermined temperature, a plurality of radiators in said structure, a relatively high pressure main for supplying a heating medium, a lower pressure supply main, and branch pipes for supplying the heating medium from the latter to the radiators, a valve device between the high pressure main and the low pressure main for controlling the supply of heating medium to the said radiators, there being a plurality of restricting orifices between said valve device and said radiators, an automatic means for regulating the said valve device proportionately to the difference in pressure between the initial and terminal pressures on opposite sides of said orifices, a thermostatically operated means under the control of the temperature changes exterior to the structure to be heated, and means whereby said thermostatically operated means participates in the control of the said valve device.

In testimony of which invention, I hereunto set my hand.

JOHN A. SERRELL.